(12) United States Patent
Chen et al.

(10) Patent No.: US 6,315,542 B1
(45) Date of Patent: Nov. 13, 2001

(54) GAS INJECTION MOLD STRUCTURE FOR A GAS AUXILIARY INJECTION MOLDING EQUIPMENT

(75) Inventors: Yung-Chih Chen, Yilan; Wen-Liang Liu; Cheng-Lung Cheng, both of Hsinchu; Chin-Yung Wu, Miaoli; Shian-Yih Wang, Taipei, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/259,859

(22) Filed: Mar. 1, 1999

(30) Foreign Application Priority Data

May 8, 1998 (TW) .................................................. 87207184

(51) Int. Cl.⁷ .................................................. B29C 45/17
(52) U.S. Cl. ................. 425/130; 425/546; 425/DIG. 224
(58) Field of Search ..................................... 264/572, 130, 264/DIG. 224, 533; 425/563, 546

(56) References Cited

U.S. PATENT DOCUMENTS

| | | | |
|---|---|---|---|
| 4,740,150 | 4/1988 | Sayer | 425/542 |
| 5,151,278 | 9/1992 | Baxi et al. | 425/130 |
| 5,162,122 | 11/1992 | Loren | 425/130 |
| 5,164,200 | 11/1992 | Johnson | 425/130 |
| 5,198,238 | 3/1993 | Baxi | 425/130 |
| 5,273,417 | 12/1993 | Nelson | 425/130 |
| 5,302,339 | 4/1994 | Baxi et al. | 264/572 |
| 5,364,252 | 11/1994 | Hlavaty et al. | 425/3 |
| 5,465,908 | 11/1995 | Kaneishi et al. | 239/571 |
| 5,466,141 | 11/1995 | Eckardt et al. | 425/130 |
| 5,545,027 | 8/1996 | Kaneishi et al. | 425/546 |
| 5,785,247 | 7/1998 | Chen et al. | 239/135 |
| 5,820,889 | 10/1998 | Erikson | 425/130 |

FOREIGN PATENT DOCUMENTS

| | | |
|---|---|---|
| 283 207 | 9/1988 | (EP) . |
| 653 282 | 5/1995 | (EP) . |
| 2 210 578 | 6/1989 | (GB) . |
| 6-79747 | 3/1994 | (JP) . |
| 7-47572 | 2/1995 | (JP) . |
| 7-80882 | 3/1995 | (JP) . |
| 8-57907 | 3/1996 | (JP) . |
| 8-112837 | 5/1996 | (JP) . |
| 8-207082 | 8/1996 | (JP) . |
| 8-281691 | 10/1996 | (JP) . |
| 10-217272 | 8/1998 | (JP) . |
| 116766 | 8/1989 | (TW) . |
| 301276 | 3/1997 | (TW) . |
| 333900 | 6/1998 | (TW) . |
| 335370 | 7/1998 | (TW) . |
| 339732 | 9/1998 | (TW) . |
| 339733 | 9/1998 | (TW) . |
| 340702 | 9/1998 | (TW) . |
| 341174 | 9/1998 | (TW) . |
| WO 92/01545 | 2/1992 | (WO) . |
| WO 92/21502 | 12/1992 | (WO) . |
| WO 93/04836 | 3/1993 | (WO) . |
| WO 95/08429 | 3/1995 | (WO) . |

*Primary Examiner*—Nam Nguyen
*Assistant Examiner*—Joseph S Del Sole
(74) *Attorney, Agent, or Firm*—Merchant & Gould P.C.

(57) ABSTRACT

Disclosed is a gas injection mold structure for use in the field of gas auxiliary injection molding, comprising a male mold and a gas injection device. The gas injection device includes a head and a cylindrical body extending from the head. The male mold is formed with a cylindrical cell. The cylindrical body has an outer periphery and the cylindrical cell has an inner wall being formed with matching outer and internal threads, respectively, such that the gas injection device is removably threaded into and affixed to the cylindrical cell by means of the cylindrical body. The cylindrical body is formed with a plurality of vertical grooves along an entire length of sides thereof. The head has a lower surface being formed with lateral grooves corresponding to the vertical grooves, such that when the gas injection device is threaded into the male mold, each vertical groove and its corresponding lateral groove jointly form a continuous passage originating from bottom of the cylindrical cell to the periphery of the head, thereby pressurized gas is injected into a cavity through the passage.

8 Claims, 5 Drawing Sheets

1

GAS INJECTION MOLD STRUCTURE FOR A GAS AUXILIARY INJECTION MOLDING EQUIPMENT

CROSS-REFERENCES TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

This invention relates to a gas injection mold structure and a gas injection device for use with the mold structure, in particular to a gas injection mold structure and gas injection device to be implemented in the field of gas auxiliary injection molding technology. This invention greatly reduces material consumption and production cost, and enhances accessibility in assembling and maintenance.

2. Description of the Related Art

Currently available Injection molded products that are manufactured by conventional molding, in particular that have immense size and diverse configurations (such as front casings of monitors, shoe lasts, and bicycle cranks), usually require relatively high production cost and extensive secondary manufacturing processes in order to attain satisfactory quality. However, to contend in the international settings that are short of manpower, cost conscious, and quality demanding, injection molds featuring gas channels are now frequently implemented in the field of advanced gas auxiliary injection molding to manufacture injection molded products that are of low cost, high rigidity, and fine appearance, and to solve technical flaws that cannot be addressed by conventional plastic injection molding. Therefore, how to engineer gas channels in molds now plays a primary role in the field of gas auxiliary injection molding (GAIM) technology. Since the key to successfully control passages of the gas channels relates to the mechanism for injecting gas into cavities, the gas injection device being provided in a mold is generally complicated in structure and requires high precision. These are reasons why the manufacturing and assembling/disassembling costs for the gas injection devices being adopted in the market can yet to be reduced to a satisfactory level.

The structure of a conventional gas injection device implemented in a conventional mold structure is described as follows. With reference to FIG. 1, a conventional gas injection mold structure 1, a gas injection device 2 is provided within a male mold 3. The gas injection device 2 includes an upper insert 4 being threaded in the male mold 3 and a lower insert 5 being affixed beneath the upper insert 4. The upper insert 4 and the lower insert 5 are formed with a gas injection passage 6 therethrough. A running stick 7 is provided within the passage 6. After or roughly when molten plastic material is injected into a cavity through sprues and runners, gas (generally being nitrogen gas) is injected through the passage 6 so as to push the running stick 7 upwards and to disengage a tapered closing face between the running stick 7 and the lower insert 5 such that the gas is injectable into the cavity 8 by passing a gap formed between the running stick 7 and the upper insert 4. After the gas is completely released, an upper tapered end and a lower tapered end of the running sick 7 urge against tips of the upper inert 4 and lower insert 5 to seal the passage 6 as a result of resiliency of a spring 9 externally provided around the running stick 7.

It is shown from FIG. 1 that the conventional gas injection device 2 comprises numerous components and is complicated in structure. In the event of malfunction, maintenance, or replacement of the gas injection device 2 (such as replacing O-rings 10 that are provided around the upper insert 4 and that are intended to avoid gas leakage, wherein the O-rings are easily damaged due to prolonged compression and thus require frequent replacement), the procedures of assembling the upper and the lower inserts 4, 5 into the male mold 3 require disassembling the overlaid laminated plate, crown block, crown plate, crown pin, and support block (not shown) that are located beneath the male mold 3 in order to replace components of the gas injection device 2. Such time-consuming procedures are one of the significant technical flaws of the conventional gas auxiliary injection molding equipment.

Furthermore, using the passage 6 of the above conventional gas injection device 2 to inject pressurized gas results in collective expulsion of gas in a longitudinal direction such that the gas directly impacts mold walls 11 and penetrates plastic products thereby resulting in gas leakage and defective products. In the conventional gas auxiliary injection molding equipment, gas the passage 6 trails predetermined gas channels to urge molten plastic material flowing towards locations of lower pressure and lower viscosity; pressure is then preserved for a fixed interval to eliminate forming of contractions and sinks on the surfaces of the plastic products within the cavity 8 during the cooling process, and to prevent, particularly, the immense products from bending, deformation, and short-shot. However, slight contractions formed during the cooling process causes a gap forming at a contact surface between a tip end of the running stick 7 and the plastic material thereby subjecting gas being injected into the mold to discharge from the gap due to contraction or forming micro cracks between the tip end of the running stick 7 and the plastic material, wherein the micro cracks ultimately cause gas discharge. Blockage formed by the plastic material at an outlet of the passage 6 that communicates the cavity 8 also greatly reduces effect of gas injection into the cavity 8. Furthermore, in such a conventional gas injection construction, repetitive impacts as a result of gas pressure between the running stick 7 and the plastic product within the cavity 8 also causes serious leakage and reverse discharge of pressurized gas.

Hence, it is desired to provide one or more gas injection devices and gas injection mold structure cooperated with the devices that solve the above limitations, reduce production cost, and enhance accessibility in assembling and maintenance. This invention discloses a creative gas injection mold structure for use in the field of gas auxiliary injection molding technology and a gas injection device as follows.

BRIEF SUMMARY OF THE INVENTION

It is a primary object of this invention to provide a gas injection mold structure for use in the field of gas auxiliary injection molding, in which the structure implements a specially engineered gas injection device that is threaded into a male mold, to evenly conduct pressurized gas towards opposing sides of a cavity so as to urge forward flow of plastic material whereby such flaws as penetration and surface sinks of plastic products are eliminated. The specially engineered gas injection device further eliminates blockage of gas passage to attain an ideal pressure preservation and eliminates gas discharge in the process of pressure preservation and cooling provide excellent air tightness. Furthermore, this invention helps to manufacture plastic products of excellent appearance because it eliminates impacts resulting from relative motion between the gas injection device and the cavity.

It is a secondary object of this invention to provide a gas injection mold structure for use in the field of gas auxiliary injection molding, in which the gas injection device is of a simple single-unit construction and is directly threaded into and affixed to the mold from a top of the mold. The gas injection device may be optionally assembled in the bosses of products (such as monitor housings), which have bosses, to perform gas injection so as to greatly reduce production cost of the gas injection device and the mold, to enhance usage and to facilitate replacement and maintenance of the gas injection device.

It is another object of this invention to provide a gas injection mold structure for use in the field of gas auxiliary injection molding that implements a single-unit, removable construction to allow the device to be assembled in various sets of gas auxiliary injection molding equipment, so as to greatly reduce procurement cost of the gas injection device and to significantly improve competitiveness of the final products.

The structure and advantages of this invention may be clearly understood by persons skilled in the art with reference to the following illustrations and descriptions of preferred embodiments.

BRIEF DESCRIPTIONS OF THE SEVERAL VIEWS OF THE DRAWINGS

DETAILED DESCRIPTION OF THE INVENTION

Figure 1:
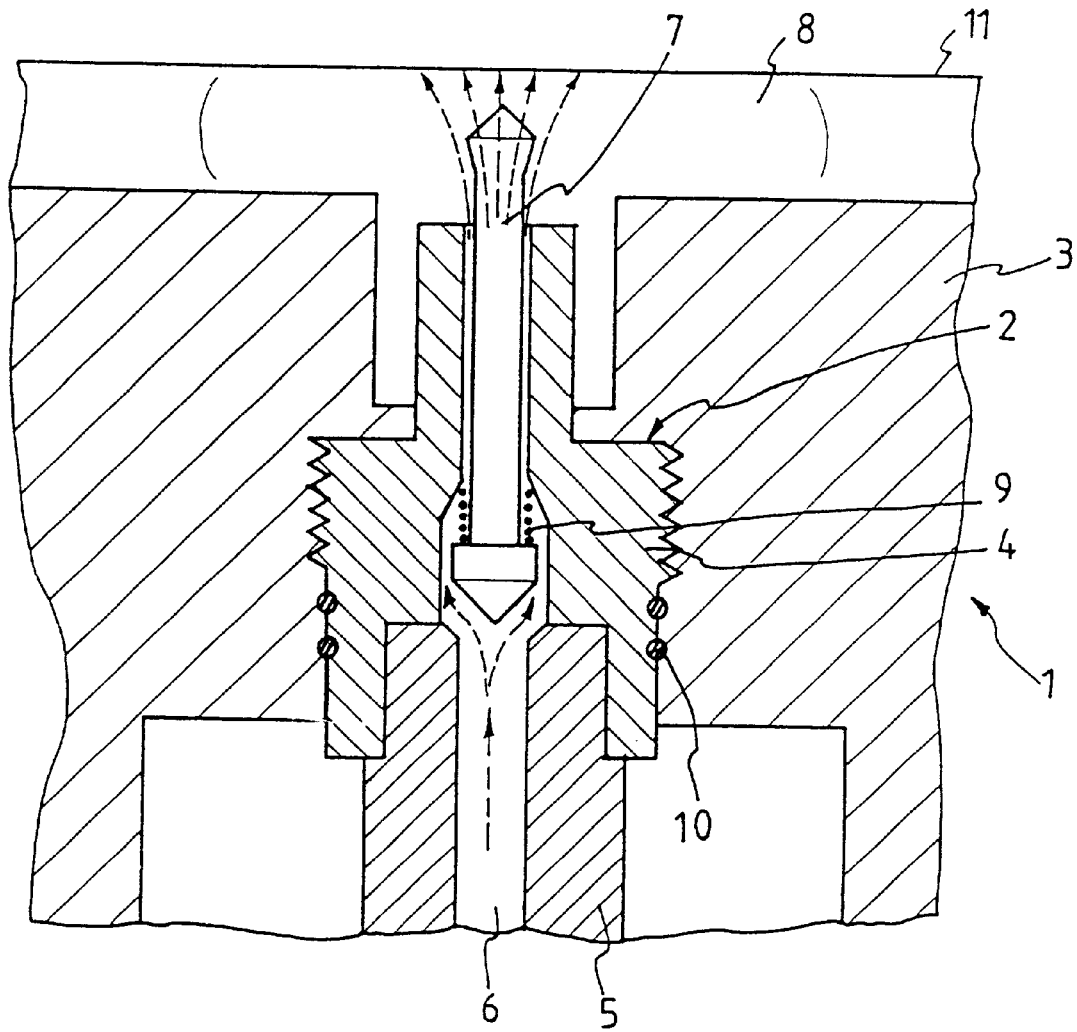
FIG. 1 is a cross-sectional schematic view of a conventional gas injection mold structure.
Figure 2:
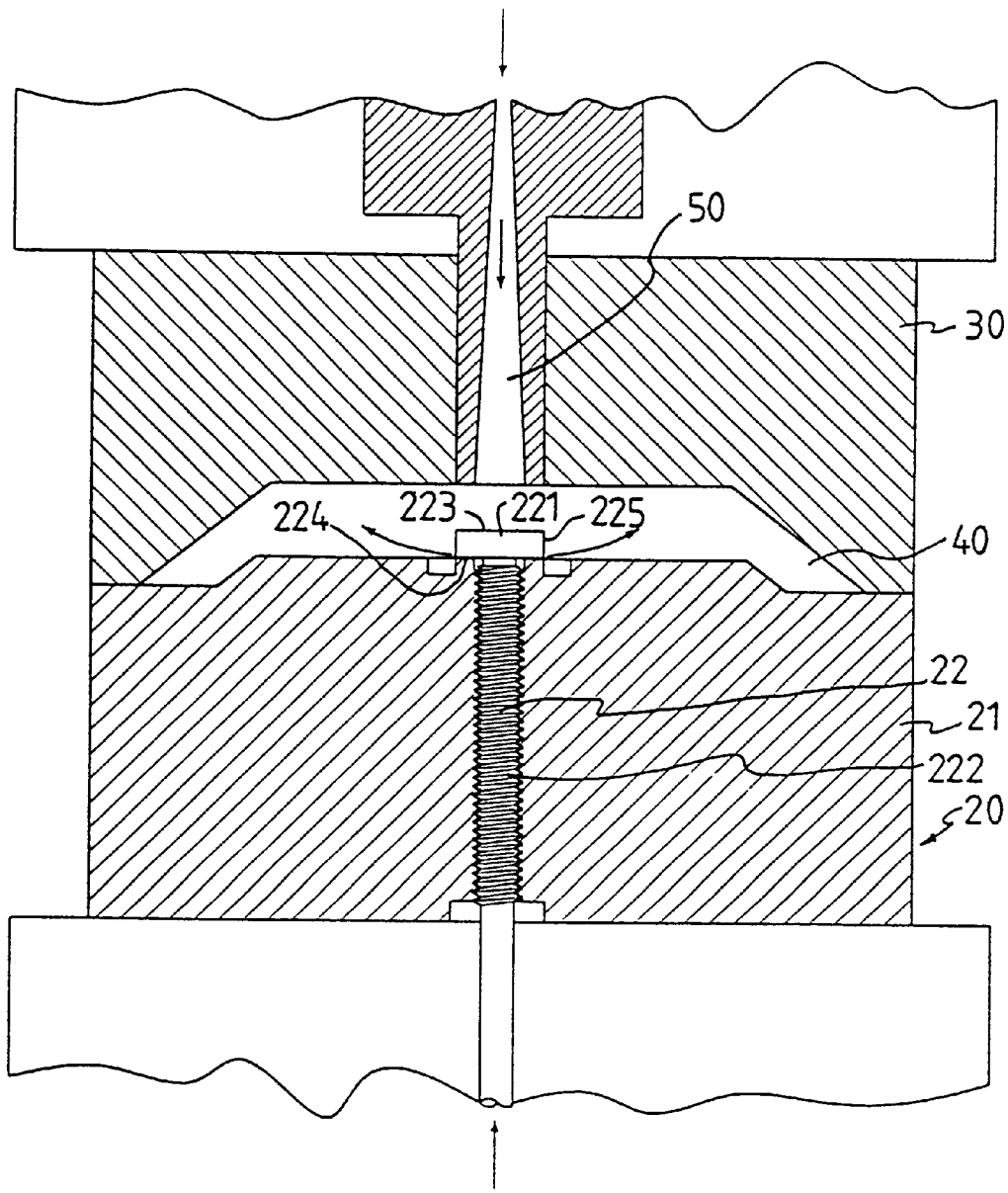
FIG. 2 is a cross-sectional schematic view showing relative positions among a gas injection device, a male mold, a female mold, and a cavity of a gas injection mold structure of this invention.

FIG. 2 is a cross-sectional view of a preferred embodiment of this invention, showing a gas injection mold structure 20 and a matching mold (commonly named as a female mold 30) that are formed with a cavity 40 and a sprue 50 therein, where plastic material is injected into the cavity 40 through the sprue 50. Gas (generally being nitrogen gas) is then injected into the cavity 40 and trails predetermined gas channels to urge molten plastic material.

Figure 5:
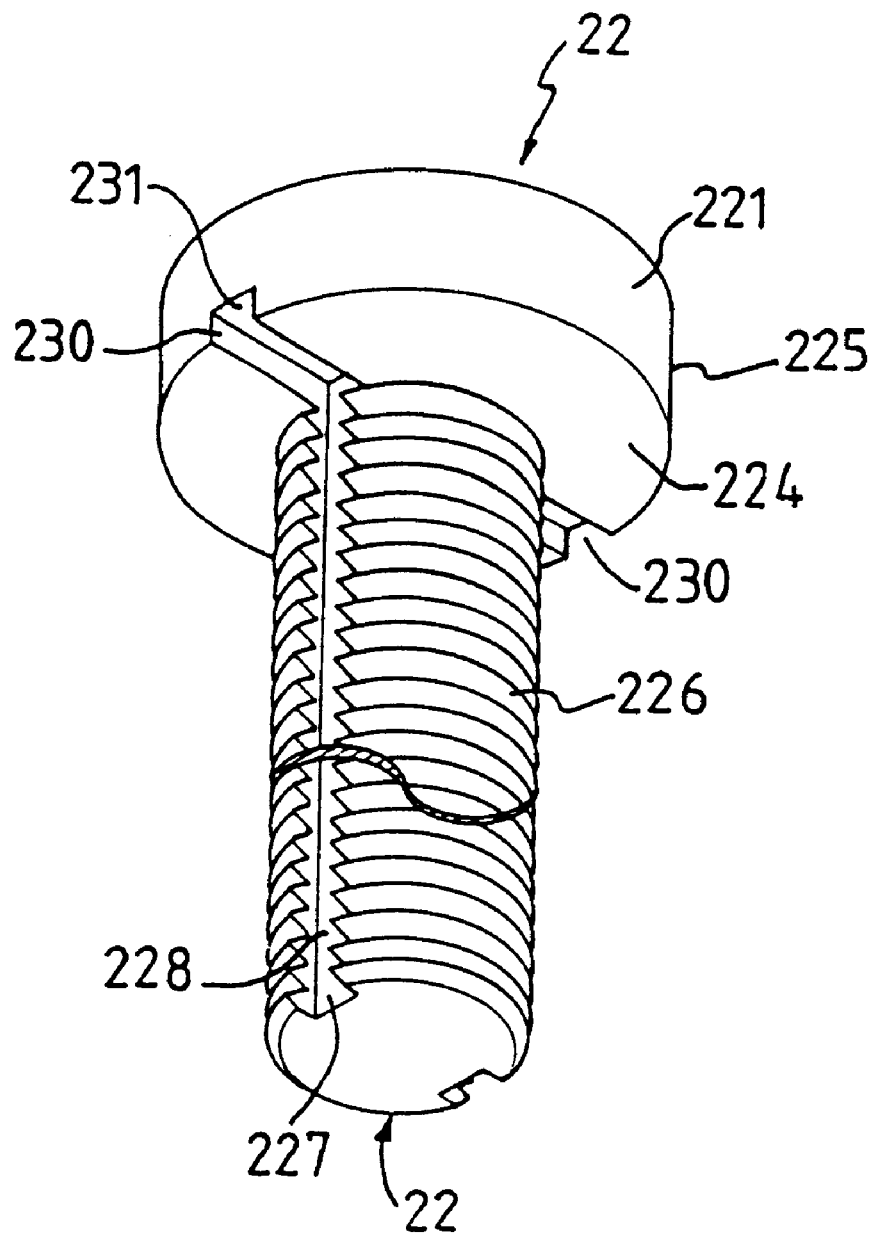
FIG. 5 is a perspective, schematic view of a gas injection device of this invention.

The gas injection mold structure 20 comprises a mold (commonly named as a male mold 21) and a gas injection device 22. The male mold 20 includes an upper surface 211. The gas injection device 22 includes a head 221 and a cylindrical body 222. A detailed, assembled view in relation to the configuration is clearly shown in FIG. 3. The head 221 includes an upper surface 223, a lower surface 224, and a periphery 225. The cylindrical body 222 extends downwards from the lower surface 224. The male mold 21 is vertically formed with a cylindrical cell 212 extending from the upper surface 211 for receiving the cylindrical body 222. The cylindrical body 222 has an outer periphery and the cylindrical cell 212 has an inner wall being thoroughly or partly formed with matching outer and internal threads, respectively, along vertical regions thereof, such that the cylindrical body 222 is removably threaded into and affixed to the cylindrical cell 212 by urging the lower surface 224 of the head 221 against the upper surface 211 of the male mold 21. With reference to FIG. 5, a preferred way for matching the male mold 21 and the gas injection device 22 relates to continuously forming external threads 226 along an entire length of the outer periphery of the cylindrical body 222, and to continuously forming internal threads 213 along an entire length of periphery of the inner wall of the cylindrical cell 212, in which the internal threads 213 match with the external threads 226 such that the cylindrical body 222 can be threaded into and affixed to the cylindrical cell 212 from the upper surface of the male mold 21.

Figure 3:
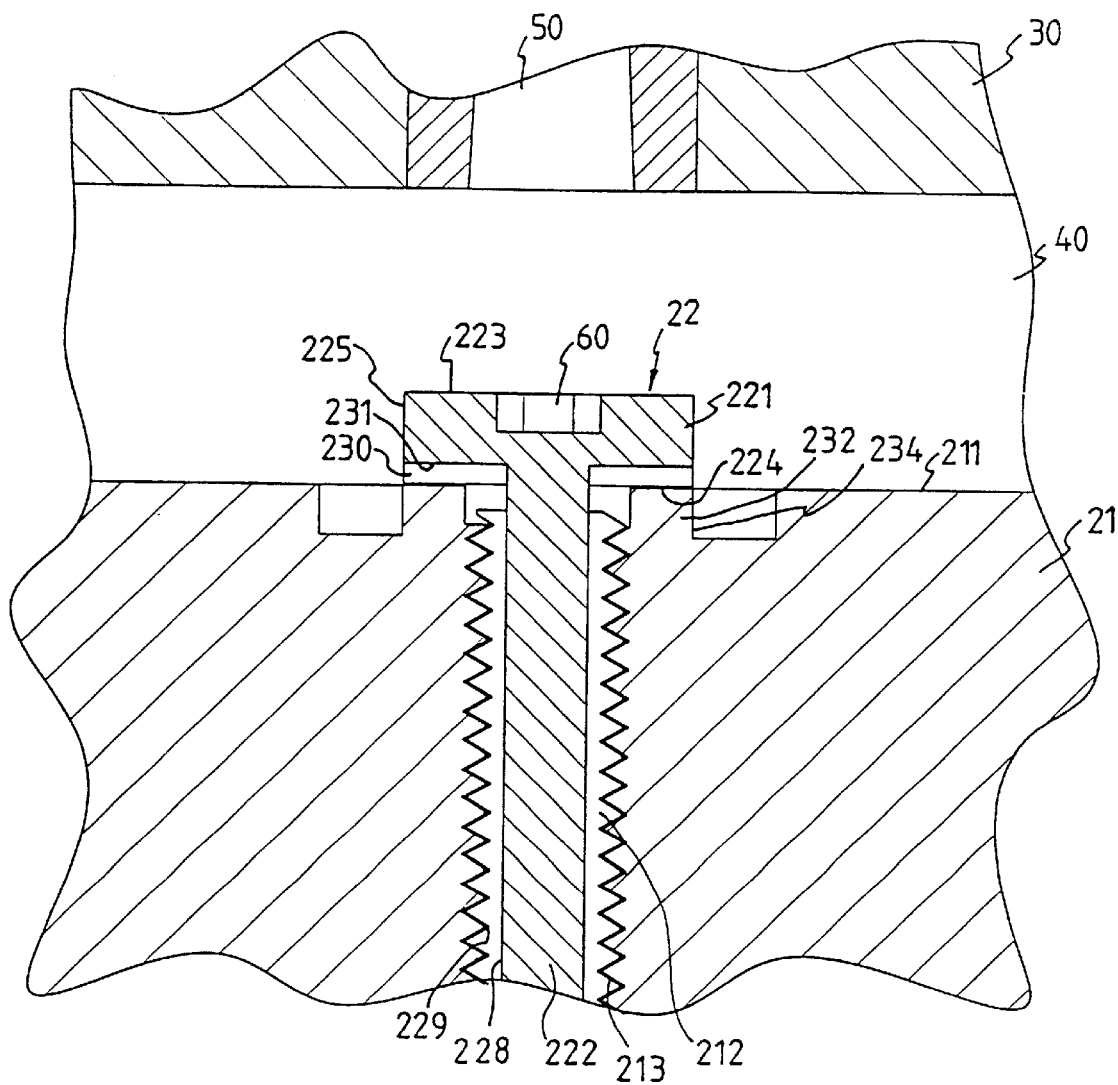
FIG. 3 is a partial, enlarged, cross-sectional schematic view of FIG. 2.
Figure 4:
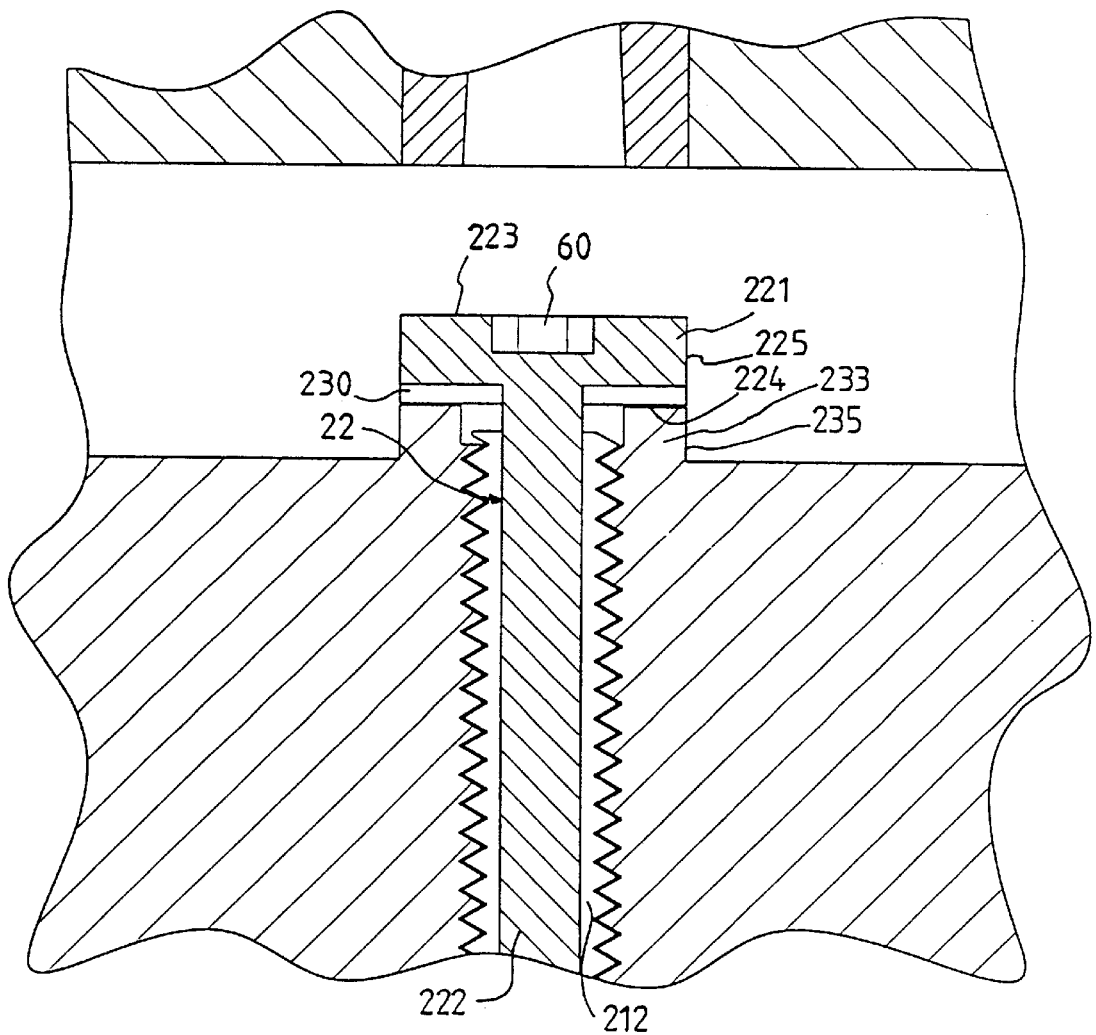
FIG. 4 is a cross-sectional schematic view of an alternative embodiment as that shown in FIG. 3.

This invention is characterized in that, the gas injection mold structure 20 further formed with a plurality of vertical grooves and corresponding lateral grooves. Each vertical groove is defined between the cylindrical body 222 and the inner wall of the cylindrical cell 212 and the lateral groove is defined between the lower surface 224 of the head 221 and the upper surface 211 of the male mold 21 whereby when the cylindrical body 222 of the gas injection device 22 is threaded into the cylindrical cell 212 of the male mold 21, each vertical groove and a corresponding lateral groove jointly form a continuous passage originating from bottom of the cylindrical cell 222 to the periphery 225 of the head 221, through which passage pressurized gas is injected into the cavity 40. As shown in FIGS. 3 and 5 illustrating a preferred embodiment of this invention, the vertical grooves 227 are formed on opposing sides of the cylindrical body 22 from bottom to top of the cylindrical body 22. Depth of the grooves (that is, radial, inward depth of the external threads) are such designed that, when the cylindrical body 22 is threaded into the cylindrical cell 212, the bottom surface 228 of each of the vertical grooves 227 is apart from thread peaks 229 of the internal threads 213 of the inner wall of the cylindrical cell 21 for 0.1 ~0.2 mm as desired. Furthermore, the lateral grooves 230 are formed at the lower surface 224 of the head 221 from tops of the vertical grooves 227 to the periphery 225 of the head 221, such that when the gas injection device 22 is threaded into the cylindrical cell 212 of the male mold 21 subjecting the head 221 to urge against the upper surface 211 of the male mold 21, the bottom surface 231 of each of the lateral grooves 230 is apart from the upper surface 211 of the male mold 21 for a distance substantially equivalent to that from the bottom surface 228 of each of the vertical grooves 227 to the thread peaks 229 of the internal threads 213, whereby gas being injected from a bottom of the cylindrical cell 212 may be smoothly and evenly conducted into the cavity 40 through the vertical grooves 227 and the lateral grooves 230 so as to urge the molten plastic material to trail the predetermined gas channels. To enhance even distribution and to avoid blockage and leakage of the air stream injected from the lateral grooves 230, the upper surface 211 of the male mold 21 is preferably provided with a recessed vertical neck 232 (FIG. 3) or a projective vertical neck 233 (FIG. 4) such that when the cylindrical body 222 is threaded into the cylindrical cell 212, the periphery 225 of the head 221 is flush with a periphery wall 234 (or 235 in FIG. 4) of the neck 232 (or 233 in FIG. 4).

Because the molten plastic material will not block the gas injection passages defined by the vertical grooves 227 and the lateral grooves 230 while being under influence of gravity, and because there is no additional medium through which the gas can be discharged, auxiliary injection molding processes that implement this invention optimize effects of pressure preservation (that is, pressure drop is not produced to cause gas channel defects during the process of pressure preservation) and maintain air tightness within gas channels of the products. This invention also helps to prevent surface sinks from forming on products of immense size and high thickness, and to prevent short shot, sinks, and penetration from forming on products of immense size and low thickness whereby defective rate of gas injection product is greatly reduced and uncertainty occurred in the gas auxiliary injection molding process is eliminated.

Aforementioned explanations are directed to the descriptions of preferred embodiments according to the present invention. Various changes and implementation, including: forming a wrench slit 60 at a central region of the upper surface 223 of the head 22 of the gas injection device 22, into the wrench slit such that a wrench may be readily inserted, for threading or ejecting the gas injection device 22 into or from the cylindrical cell 21 of the male mold 21; modifying configuration of the periphery 225 of the head 221 for easy engagement with a socket wrench; and changing manners for joining or affixing the cylindrical body to the cylindrical cell so as to attain equivalent effects, can be made by those skilled in the art without departing from the technical concept of the present invention as set forth in the following claims.

What is claimed is:

1. A gas injection mold structure for use in gas auxiliary injection molding, comprising:
    a mold, including a mold upper surface; and
    an injection device, including:
        a head having an upper surface, a lower surface, and a periphery;
        a cylindrical body extending downwards from the lower surface of the head and being formed with external threads along at least part of a longitudinal region around the body; wherein:
            the mold is vertically formed with an opening in the mold so as to define a cylindrical cell integral to the mold and extending from the mold upper surface for receiving the cylindrical body, the cylindrical cell having an inner wall being formed with internal threads along at least part of a vertical region of the mold thereof for matching with the external threads for removable threading engagement with the cylindrical body; and
        the gas injection mold structure further comprises a plurality of vertical grooves and corresponding lateral grooves, each vertical groove being defined between the cylindrical body and an inner wall of the cylindrical cell and each lateral groove being defined between the lower surface of the head and the mold upper surface, whereby when the cylindrical body of the gas injection device is threaded into the cylindrical cell of the mold, each of the vertical grooves and the corresponding lateral grooves jointly form a continuous passage originating from a bottom of the cylindrical cell to the periphery of the head.

2. The gas injection mold structure according to claim 1, wherein the external threads are continuously formed along an entire length of an outer periphery of the cylindrical body.

3. The gas injection mold structure according to claim 2, wherein each of the vertical grooves is formed on a side of the cylindrical body from a bottom to a top of the cylindrical body.

4. The gas injection mold structure according to claim 3, wherein each of the lateral grooves is formed on the lower surface of the head from a top of the vertical groove to the periphery of the head.

5. The gas injection mold structure according to claim 4, wherein the cylindrical body is formed with two opposing vertical grooves on opposing sides thereof and the lower surface of the head is correspondingly formed with two opposing lateral grooves.

6. The gas injection mold structure according to claim 1, wherein the head is formed with a wrench slit on a central region of the upper surface of the head.

7. The gas injection mold structure according to claim 1, wherein the mold is a male mold.

8. The gas injection mold structure according to claim 7, wherein the male mold is further provided with a vertical neck on the mold upper surface thereof such that when the cylindrical body is threaded into the cylindrical cell, the periphery of the head is flush with a periphery of the neck.

* * * * *